(12) United States Patent
Kaemmerer et al.

(10) Patent No.: US 12,617,320 B2
(45) Date of Patent: May 5, 2026

(54) VEHICLE SEAT AND METHOD FOR ASSEMBLING A VEHICLE SEAT

(71) Applicant: Adient US LLC, Plymouth, MI (US)

(72) Inventors: Joachim Kaemmerer, Kaiserslautern (DE); Gregor Lubczyk, Kaiserslautern (DE); Markus Weber, Waldmohr (DE); Ralph Recktenwald, Freisen (DE); Holger Kunz, Otterberg (DE)

(73) Assignee: Adient US LLC, Plymouth, MI (US)

( * ) Notice: Subject to any disclaimer, the term of this patent is extended or adjusted under 35 U.S.C. 154(b) by 364 days.

(21) Appl. No.: 18/548,400

(22) PCT Filed: Mar. 10, 2022

(86) PCT No.: PCT/IB2022/052137
§ 371 (c)(1),
(2) Date: Aug. 30, 2023

(87) PCT Pub. No.: WO2022/195410
PCT Pub. Date: Sep. 22, 2022

(65) Prior Publication Data
US 2024/0140279 A1 May 2, 2024

(30) Foreign Application Priority Data

Mar. 17, 2021 (DE) ..................... 10 2021 106 569.0
Jun. 17, 2021 (DE) ..................... 10 2021 115 685.8

(51) Int. Cl.
*B60N 2/30* (2006.01)
*B60N 2/015* (2006.01)
*B60N 2/90* (2018.01)

(52) U.S. Cl.
CPC ....... *B60N 2/3004* (2013.01); *B60N 2/01516* (2013.01); *B60N 2/307* (2013.01);
(Continued)

(58) Field of Classification Search
CPC ....... B60N 2/305; B60N 2/307; B60N 2/3088
See application file for complete search history.

(56) References Cited

U.S. PATENT DOCUMENTS 6,869,138 B2 * 3/2005 Rhodes .................. B60N 2/309
296/65.09
10,518,663 B1 * 12/2019 Kakishima ........... B60N 2/0155
(Continued)

FOREIGN PATENT DOCUMENTS

CH 383795 A 10/1964
CN 200960863 Y 10/2007
(Continued)

OTHER PUBLICATIONS

European Patent Office, International Search Report and Written Opinion in Application No. PCT/IB2022/052137, dated Jun. 3, 2022, 12 pages, Rijswijk Netherlands.
(Continued)

*Primary Examiner* — Timothy J Brindley
(74) *Attorney, Agent, or Firm* — Marshall & Melhorn, LLC

(57) ABSTRACT

A vehicle seat may have a seat part which can be moved from a usage position into a non-usage position, a seat back, a base, and a seat kinematics connecting the seat part pivotably to the base. The seat kinematics may have a rocker which by a first rotary joint is deflected pivotably on an adapter connected to the base and by a second rotary joint is deflected pivotably on the seat part. A spacing between the base and the seat part can be changed by selection of a first articulation point for articulation of the first pivot joint on the adapter fixedly connected to the base, and/or by selection of a second articulation point for articulation of the second pivot joint on the seat part. A method for assembling such a vehicle seat is also provided.

18 Claims, 4 Drawing Sheets

(52) U.S. Cl.
     CPC ........... *B60N 2/3088* (2013.01); *B60N 2/919*
                    (2018.02); *B60N 2002/967* (2018.02)

(56) References Cited

U.S. PATENT DOCUMENTS

| | | | | |
|---|---|---|---|---|
| 10,829,014 | B2 * | 11/2020 | Sivaraj | .................... B60N 2/36 |
| 2008/0122277 | A1 | 5/2008 | Labuwy et al. | |
| 2017/0240068 | A1 | 8/2017 | Ramachandra et al. | |

FOREIGN PATENT DOCUMENTS

| | | | | |
|---|---|---|---|---|
| CN | 112406642 | A | 2/2021 | |
| DE | 4224458 | A1 | 1/1994 | |
| DE | 19529233 | A1 | 2/1997 | |
| DE | 10032460 | A1 | 2/2002 | |
| DE | 102008030781 | B3 | 11/2009 | |
| DE | 202009013530 | U1 | 2/2010 | |
| DE | 102008050468 | B3 | 4/2010 | |
| DE | 102016202513 | A1 | 8/2017 | |
| FR | 2817210 | A1 * | 5/2002 | ........... B60N 2/3011 |

OTHER PUBLICATIONS

China National Intellectual Property Administration, Office Action in Application No. CN202280018285.4 dated Oct. 28, 2025, 12 pages.

* cited by examiner

VEHICLE SEAT AND METHOD FOR ASSEMBLING A VEHICLE SEAT

FIELD

The invention relates to a vehicle seat, in particular motor vehicle seat, the vehicle seat having a seat part which is transferable from at least one use position, suitable for conveying a passenger, to at least one non-use position and back; a backrest, in particular a backrest articulated on the seat part; a base which is connectable to a vehicle floor; and a seat kinematics which pivotably connects the seat part to the base so as to transfer the seat part from the use position to the at least one non-use position and back, wherein the seat kinematics has a rocker which by a first rotary joint is pivotably articulated on the base or an adapter that is fixedly connected to the base, and by a second rotary joint is pivotably articulated on the seat part. The invention moreover relates to a method for assembling a vehicle seat.

BACKGROUND

Known from DE 10 2008 050 468 B3 is a vehicle seat which is transferable from a use position, suitable for conveying a passenger, to a forward-pivoted non-use position, having a base; a rocker which is articulated on a front foot; a seat cushion which is articulated on the rocker and as a structure has a seat cushion support from the rear of which an arm projects, a joint being disposed on the end of the latter; a control arm which is articulated on the front foot; a rear foot that is articulated on the control arm and is able to be releasably locked to the base; and a backrest which by at least one lockable fitting is articulated on the rear foot so as to be pivotable about a backrest pivot axis and in terms of the rake thereof relative to the rear foot is adjustable; wherein the seat cushion by the joint is articulated on the backrest so as to be offset from the backrest pivot axis.

DE 195 29 233 A1 discloses a vehicle seat, the vehicle seat having a seat part which is transferable from at least one use position, suitable for conveying a passenger, to at least one non-use position and back; a backrest; a base which is connectable to a vehicle floor; and a seat kinematics which for transferring the seat part from the use position to the at least one non-use position and back pivotably connects the seat part to the base, wherein the seat kinematics has a rocker which by a first rotary joint is pivotably articulated on an adapter that is fixedly connected to the base, and by a second rotary joint is pivotably articulated on the seat part, wherein a spacing between the base and the seat part disposed in the use position is infinitely variable.

Known from DE 42 24 458 A1 is a seat cushion adjustment for vehicle seats, which is controlled as a function of a primary adjustment, wherein a separate adjustment mechanism which establishes the profile curve of the seat cushion adjustment within a limited adjustment range and has extreme positions that are assigned to the extreme orientations of at least one primary adjustment is provided, as a result of which it is avoided that defined external adjustment range limits of the seat cushion adjustment are exceeded.

SUMMARY

The invention is based on the object of improving a vehicle seat of the type mentioned at the outset. In particular, it should be possible for the vehicle seat to be adapted to different heights of vehicle floors while using simple means and maintaining a seat reference point.

This object is achieved according to the invention by a vehicle seat, in particular motor vehicle seat, the vehicle seat having a seat part which is transferable from at least one use position, suitable for conveying a passenger, to at least one non-use position and back; a backrest, in particular a backrest articulated on the seat part; a base which is connectable to a vehicle floor, and a seat kinematics which pivotably connects the seat part to the base so as to transfer the seat part from the use position to the at least one non-use position and back, wherein the seat kinematics has a rocker which by a first rotary joint is pivotably articulated on the base or an adapter that is fixedly connected to the base, and by a second rotary joint is pivotably articulated on the seat part. A spacing between the base and the seat part disposed in the use position is variable by selecting a first articulation point for articulating the first rotary joint on the base or on the adapter that is fixedly connected to the base, and/or by selecting a second articulation point for articulating the second rotary joint on the seat part.

As a result of the spacing between the base and the seat part disposed in the use position being variable by selecting a first articulation point (of at least two first articulation points) for articulating the first rotary joint on the base or on the adapter that is fixedly connected to the base, and/or by selecting a second articulation point (of at least two second articulation points) for articulating the second rotary joint on the seat part, the vehicle seat can be adapted to different vehicle floor heights while maintaining the seat reference point and without changing the three-dimensional shape of components.

No additional components are required, this saving in particular tooling costs. Only interchangeable tool inserts for punching hole patterns at different positions are potentially required. Interchangeable tool inserts are preferably also dispensed with in that the vehicle seat always has the complete set of hole patterns.

A vehicle seat according to the invention can in particular be used for variants of vehicle platforms in which different vehicle floor heights are used owing to the use of different drives (internal combustion engine, electric drive). For example, the different vehicle floor heights result from an installation space which has to be kept available for batteries of an electric drive but is dispensed with in a vehicle with an internal combustion engine.

Selecting the first articulation point (of at least two first articulation points) for articulating the first rotary joint on the base or on the adapter that is fixedly connected to the base is also to be understood to be a selection of an adapter (having a corresponding first articulation point) from a plurality of adapters which, with the exception of different first articulation points, are identical. Such adapters can be manufactured, in particular formed, in the same tool. Only interchangeable tool inserts for the different first articulation points, in particular holes, are to be provided. In analogous manner, selecting a second articulation point for articulating the second rotary joint on the seat part is also to be understood to be a selection of a seat part (having a corresponding second articulation point) from a plurality of seat parts which, with the exception of different second articulation points, are identical.

The seat part in the use position can be able to be locked to the base, in particular to a counter element that is fixedly connected to the base or the vehicle floor, by a locking mechanism. The locking mechanism is preferably a rotary latch lock. The locking mechanism can be connected to the seat part by an attachment adapter. A position of the attachment adapter, in particular a position of the attachment adapter relative to the seat part, can be adaptable to the spacing. Alternatively or additionally, a position of the locking mechanism relative to the attachment adapter can preferably be adaptable to the spacing.

The seat kinematics preferably has a further rocker which by a third rotary joint is pivotably articulated on the base or an adapter that is fixedly connected to the base, and by a fourth rotary joint is pivotably articulated on the seat part. An articulation point for articulating the third rotary joint on the base or on the adapter that is fixedly connected to the base, and/or an articulation point for articulating the fourth rotary joint on the seat part, are/is preferably selected so as to correspond to the spacing.

Selecting the third articulation point (of at least two third articulation points) for articulating the third rotary joint on the base or on the adapter that is fixedly connected to the base, is also to be understood to be a selection of an adapter (having corresponding first and third articulation points) from a plurality of adapters which, with the exception of different first and third articulation points, are identical.

Such adapters can be manufactured, in particular formed, in the same tool. Only interchangeable tool inserts for the different first and third articulation points, in particular holes, are to be provided. In analogous manner, selecting a fourth articulation point for articulating the fourth rotary joint on the seat part is also to be understood to be a selection of a seat part (having corresponding second and fourth articulation points) from a plurality of seat parts which, with the exception of different second and fourth articulation points, are identical.

A selection between at least two articulation points can be made for at least one rotary joint. At least two articulation points are preferably in each case provided for the first rotary joint and for the second rotary joint. At least two articulation points are preferably in each case provided for a third rotary joint and for a fourth rotary joint.

The base, or an adapter that is fixedly connected to the base, can have at least two selectable first articulation points for the first rotary joint. The first articulation points can be disposed below one another in the vertical direction. Additionally, the first articulation points can be disposed so as to be mutually offset in the longitudinal direction. The seat part, in particular a lateral part of the seat part, can have at least two selectable second articulation points for the second rotary joint. The second articulation points can be disposed below one another in the vertical direction. Additionally, the second articulation points can be disposed so as to be mutually offset in the longitudinal direction. A connecting line that connects the centers of two second articulation points to one another can run obliquely to a vertical direction, in particular run at an angle of approximately 45 degrees to the vertical direction.

The base, or an adapter that is fixedly connected to the base, can have at least two selectable third articulation points for a third rotary joint. The third articulation points can be disposed below one another in the vertical direction. Additionally, the third articulation points can be disposed so as to be mutually offset in the longitudinal direction. The seat part, in particular a lateral part of the seat part, can have at least two selectable fourth articulation points for a fourth rotary joint. The fourth articulation points can be disposed below one another in the vertical direction. Additionally, the fourth articulation points can be disposed so as to be mutually offset in the longitudinal direction. A connecting line that connects the centers of two fourth articulation points to one another can run obliquely to a vertical direction, in particular run at an angle of approximately 30 degrees to the vertical direction.

As an alternative to an adapter having at least two selectable articulation points for exactly one rotary joint, a selection of an adapter can take place from a parts kit having at least two adapters. The vehicle seat can then be adaptable to different vehicle floor heights by selecting and replacing the adapter. With the exception of the respective disposal of the articulation points, the at least two adapters are preferably identically configured. The adapters can be easily replaced by screwing the adapters to the base, in particular without the vehicle seat having to be comprehensively disassembled.

At least one articulation point can have an opening. At least one articulation point can have an opening in a lateral part of the seat part, or in the base or an adapter that is fixedly connected to the base, in particular for mounting and/or passing through a rotary bearing pin. The rotary bearing pin can be rotatably mounted in the opening. The rotary bearing pin can be rotatably mounted in a bearing bushing disposed in the opening.

The rotary bearing pin can be screwed into an articulation point which has an internal thread and is in the lateral part of the seat part, or in the base or the adapter that is fixedly connected to the base. The internal thread can be an internal thread of a weld nut. The weld nut can be co-aligned with the opening. The weld nut can be welded to the lateral part of the seat part, or to the base, or to the adapter that is fixedly connected to the base. Alternatively, the rotary bearing pin can be riveted to the lateral part of the seat part, to the base, or to the adapter that is fixedly connected to the base.

The object is moreover achieved by a method for assembling a vehicle seat according to the invention, wherein a spacing between the base and the seat part disposed in the use position is specified; a selection of the first articulation point for articulating the first rotary joint on the base, or on the adapter that is fixedly connected to the base, and/or a selection of the second articulation point for articulating the second rotary joint on the seat part, take/takes place so as to correspond to the specific spacing; and the first rotary joint in the selected articulation point is connected to or formed with the base, or the adapter that is fixedly connected to the base, and/or the second rotary joint in the selected articulation point is connected to or formed with the seat part.

A locking mechanism is preferably positioned relative to the seat part and at least indirectly fastened to the seat part as a function of the specified spacing. The locking mechanism can interact in a locking manner with a counter element, in particular a counter element that is connected to the base.

Maximum variability is provided by the invention. It is even conceivable that the vehicle seat is removed from a vehicle with an internal combustion engine and installed in a vehicle with an electric drive, even if the vehicles have different vehicle floor heights. This reduces the diversity of variants in terms of construction, during assembly and even in the spare parts business. In terms of the invention it is irrelevant whether the corresponding adaptation of the vehicle seat can take place exclusively prior to assembling the vehicle seat or else thereafter. It is relevant that the components are conceived in such a manner that different vehicle seats for different vehicle floor heights can be implemented using corresponding identical parts, in particular without changing the seat reference point in the process.

DESCRIPTION OF THE FIGURES

The invention is explained in more detail hereunder by way of an advantageous exemplary embodiment illustrated in FIGS. 2A to 3A and a variant of the exemplary embodiment illustrated in FIGS. 3B and 3C. However, the invention is not limited to this exemplary embodiment and its variant. In the figures.

DETAILED DESCRIPTION

A vehicle seat 100 known from the prior art and a vehicle seat 101 according to the invention are described hereunder.

The vehicle seats 100; 101 are described hereunder while using three spatial directions running perpendicularly to one another. A longitudinal direction x in a vehicle seat 100; 101 installed in the vehicle runs largely horizontal and preferably parallel to a vehicle longitudinal direction, the latter corresponding to the usual travel direction of the vehicle. A transverse direction, running perpendicularly to the longitudinal direction x, is likewise horizontally aligned in the vehicle and runs parallel to a vehicle transverse direction. A vertical direction z runs perpendicularly to the longitudinal direction x and perpendicularly to the transverse direction. In a vehicle seat 100; 101 installed in the vehicle, the vertical direction z runs parallel to the vehicle vertical axis.

The positional and directional indications used, such as front, rear, top and bottom, for example, relate to a direction of view of a person sitting in a normal seated position in the vehicle seat 100; 101, wherein the vehicle seat 100; 101 is installed in the vehicle, is in the use position suitable for conveying a passenger and has a largely upright backrest 110 and is aligned as usual in the travel direction. However, the vehicle seat 100; 101 according to the invention can also be installed in an alignment deviating therefrom, for example transversely to the travel direction.

Figure 1:
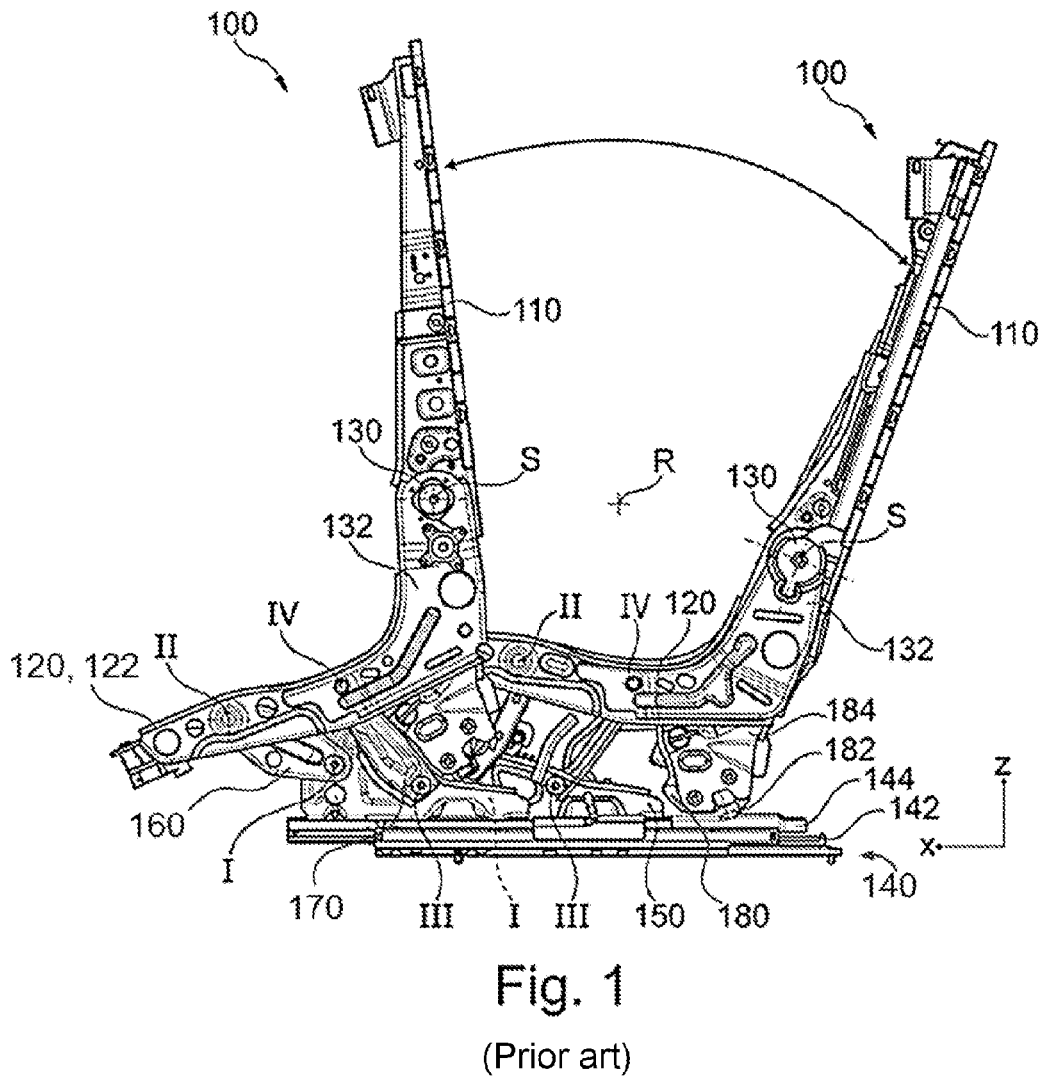
FIG. 1: shows a lateral view of a vehicle seat known from the prior art, both in a use position as well as in a non-use position, whereby any preferably present upholstery of the vehicle seat is not illustrated.

FIG. 1 shows the vehicle seat 100 known from the prior art for a vehicle, in particular a motor vehicle, wherein an upholstery of the vehicle seat 100 comprising foam parts and seat covers is not illustrated. For example, the vehicle seat 100 is a component part of a central seat row of a vehicle, for example of a van. The seat row can be split at a ratio of 40% to 60%, or 40% to 20% to 40%, for example. The vehicle seat 100 according to the invention can be, for example, a 20%, 40% or 60% part of the seat row and offer a seat for exactly one person or two persons.

The vehicle seat 100 can selectively assume at least one use position suitable for conveying a passenger (illustrated on the right in FIG. 1), and an entry position as a non-use position (illustrated on the left in FIG. 1). In the entry position, access to a further seat row disposed behind the vehicle seat 100 is facilitated.

The vehicle seat 100 has a backrest 110 and a seat part 120. The backrest 110 comprises a supporting backrest structure and a backrest upholstery not illustrated in the figures. The term backrest 110 is intended to be understood to be the entire module, composed of the backrest structure and the backrest upholstery. The seat part 120 comprises a seat cushion support which supports a seat part upholstery not illustrated in the figures.

For the sake of simplicity and as far as expedient, only one vehicle seat side of the substantially symmetrical vehicle seat 100 will be described hereunder, i.e. the components mentioned hereunder are present twice (preferably so as to be mirror-symmetrical in relation to a symmetry plane running perpendicularly to the transverse direction), unless otherwise described. First, the vehicle seat 100 will be described in a use position illustrated on the right in FIG. 1. In the use position of the vehicle seat 100, the seat part 120 assumes exactly one use position while the rake of the backrest 110 may be variable within an adjustment range for comfort. A so-called seat reference point R (also referred to as the H-point) is assigned to the use position.

The seat cushion support of the seat part 120 on both sides of the seat has in each case one lateral part 122. The two lateral parts 122 are preferably connected to one another by a crossbeam in a front region of the seat part 120. The two lateral parts 122 and the crossbeam form a U-shaped seat cushion support to which the backrest 110 is on both sides connected by in each case one fitting 130 and one fitting adapter 132. The backrest 110 in terms of its rake is adjustable by the fittings 130 so that a plurality of use positions of the backrest 110 are defined. In a variant of the exemplary embodiment, the fittings can be lockable in only exactly one use position of the backrest 110.

A base 140 of the vehicle seat 100 is connectable to a body structure of the vehicle. The base 140 presently has a first seat rail 142, which is connectable to the body structure, and a second seat rail 144 which is displaceable relative to said first seat rail 142 in the longitudinal direction x. The two seat rails 142 and 144 which have substantially U-shaped profiles engage behind one another in an alternating manner by way of the longitudinal peripheries thereof that are bent inward and outward, respectively, and are able to be locked to one another by a rail locking device known per se. The rail locking device can be unlocked manually, for example, by an unlocking bracket known per se.

An adapter 150, which presently is fixedly connected to the second seat rail 144, is attached to the base 140. Alternatively, the adapter 150 can be embodied so as to be integral to the second rail 144. In a variant of the exemplary embodiment, the adapter 150 can however also be releasably lockable to the base 140. The adapter 150 is a component part of the base 140. The lateral part 122 of the seat part 120 is articulated on the adapter 150 by a rocker 160 and a further rocker 170 disposed behind this rocker 160. The base 140 (or the adapter 150 thereof), the rocker 160, the further rocker 170, and the seat part 120 (or the lateral part 122 thereof) form a seat kinematics K for transferring the seat part 120 from the use position to the at least one non-use position and back. The seat kinematics K is a coupling mechanism embodied as a four-link assembly.

The rocker 160 has two ends. One rotary joint I, II is in each case disposed in the regions of these two ends, of which a first rotary joint I forms the articulation of the rocker 160 on the adapter 150, and a second rotary joint II forms the articulation of the rocker 160 on the lateral part 122.

The further rocker 170 has two ends. One rotary joint III, IV is in each case disposed in the regions of these two ends, of which a third rotary joint III forms the articulation of the further rocker 170 on the adapter 150, and a fourth rotary joint IV forms the articulation of the further rocker 170 on the lateral part 122. The third rotary joint III is disposed behind the first rotary joint I. The fourth rotary joint IV is disposed behind the second rotary joint II.

The rotary joints I, II, III, IV described enable in each case rotation about a rotation axis running parallel to the transverse direction. The rotary joints I, II, III, IV are in each case present on both sides of the seat. The two fittings 130 form a backrest pivot axis S.

The seat part 120, presently in a rear region of the lateral part 122, is releasably lockable to the base 140 by a locking device 180, for example a rotary latch lock. To this end, the locking device 180 is able to be locked to a counter element 182 of the base 140, for example a pin in the second seat rail 144. As a result, a pivoting movement of the seat part 120 by way of the seat kinematics K, from the use position in the direction of the non-use position, is able to be locked. In the case of a locked locking device 180, pivoting of the rockers 160, 170 relative to the base 140 is thus not possible. The locking device 180 is connected to the seat part 120, in particular the lateral part 122, by an attachment adapter 184. The attachment adapter 184 is fixedly connected, for example screwed, riveted or welded, to the lateral part 122.

The vehicle seat 100 can be transferred from the use position suitable for conveying a passenger, illustrated on the right in FIG. 1, to a non-use position (entry position) not suitable for conveying a passenger, illustrated on the left in FIG. 1. To this end, the locking device 180 is unlocked and the seat part 120 is pivoted forward by the seat kinematics K. The fittings 130 remain locked in the process such that the backrest 110 maintains its angular position relative to the seat part 120.

Moreover, the vehicle seat 100 in the entry position is preferably displaced forward in the longitudinal direction x by way of the seat rails 142, 144. As a result, access to a further seat row disposed behind the vehicle seat 100 is facilitated. For example, the rail locking device, for example by way of a cable mechanism, can be coupled to the further rocker 170 in such a manner that the pivoting movement of the further rocker 170, when transitioning from the use position to the entry position, inevitably opens the rail locking device.

Transferring the seat part 120 from the non-use position to the use position is performed in the reverse order.

Figure 2A:
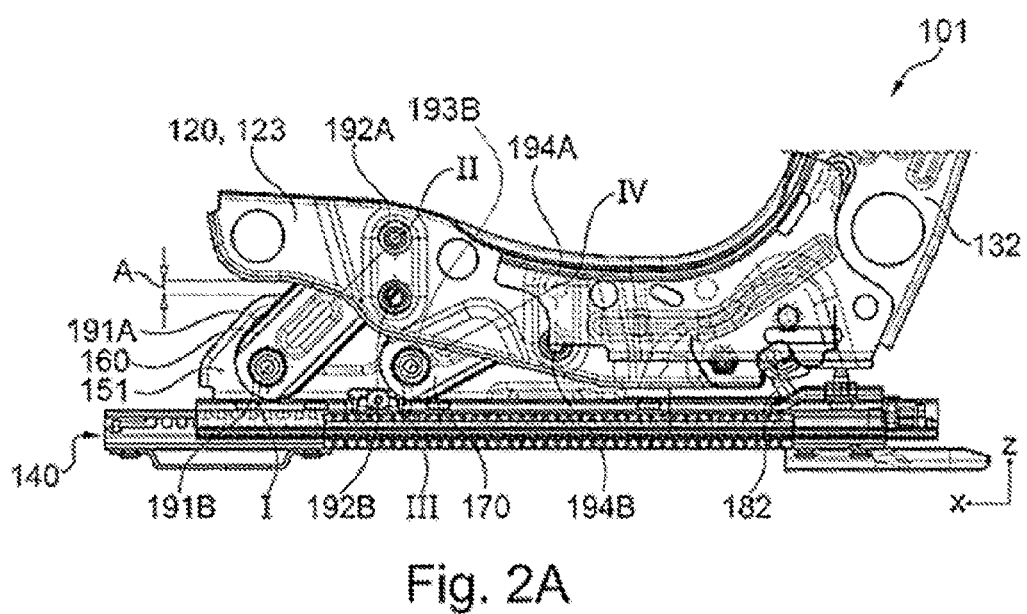
FIG. 2A: shows in fragments a lateral view of a vehicle seat according to the invention in a use position, having a spacing between a base and a seat part of the vehicle seat.
Figure 2B:
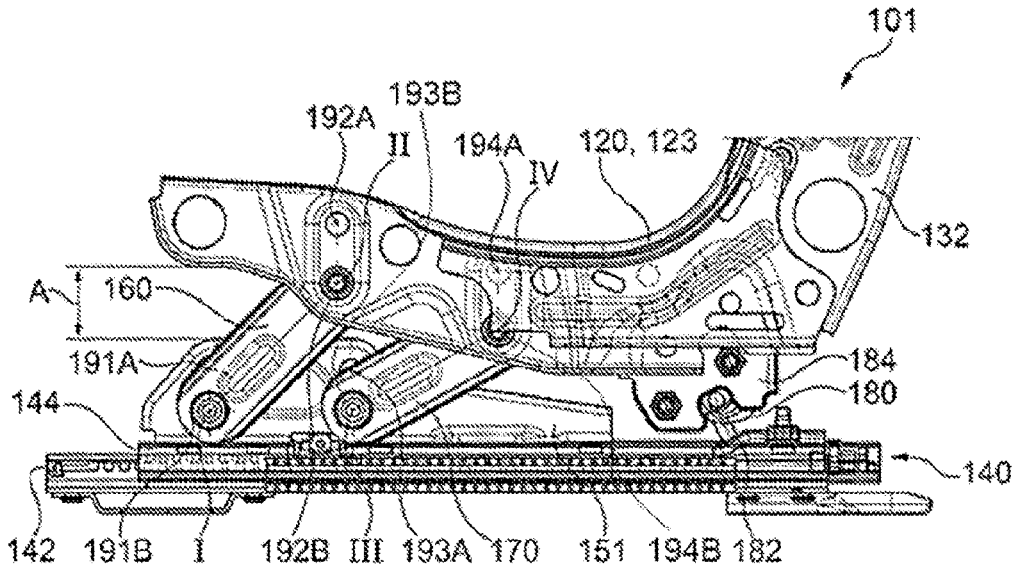
FIG. 2B: shows in fragments a lateral view of the vehicle seat from FIG. 2A in the use position, having a spacing between the base and the seat part that is changed in comparison to FIG. 2A.
Figure 2C:
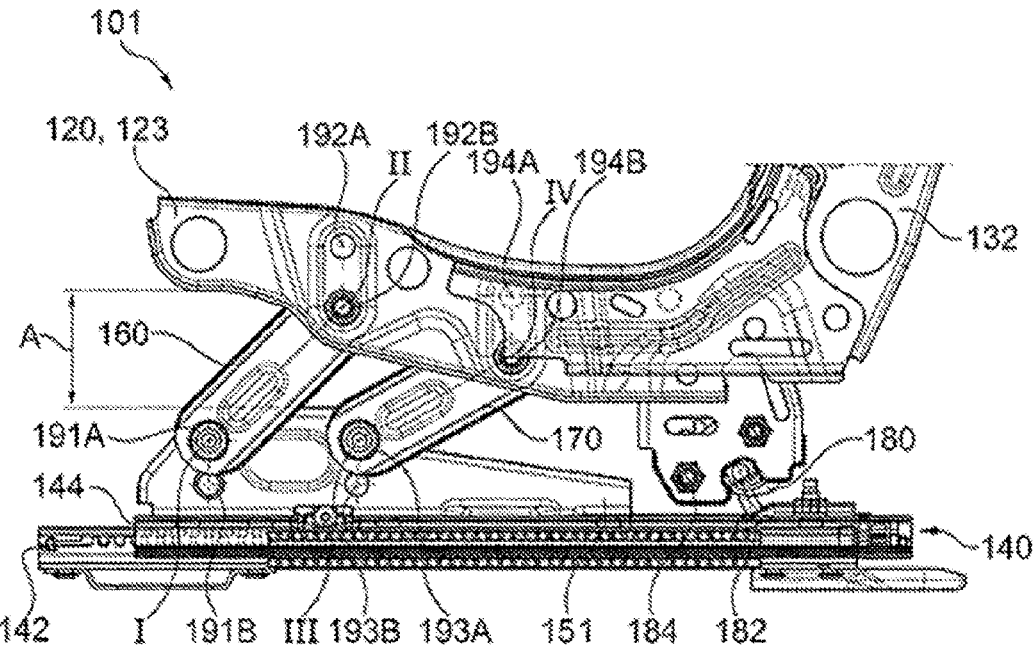
FIG. 2C: shows in fragments a lateral view of the vehicle seat from FIG. 2A in the use position, having a spacing between the base and the seat part that is changed in comparison to FIGS. 2A and 2B.

FIGS. 2A, 2B and 2C show a vehicle seat 101 according to the invention which, with the exception of the differences described hereunder, in terms of function and construction corresponds to the previously described vehicle seat 100 so that the description and the illustration of the vehicle seat 100 also apply to the vehicle seat 101 according to the invention, unless otherwise described. Identical or functionally equivalent components of the two exemplary embodiments are provided with the same reference signs. The vehicle seat 101 according to the invention differs from the vehicle seat 100 known from the prior art in particular on account of a modified lateral part 123 of the seat frame 120 and a modified adapter 151. As a result, the vehicle seat 101, as opposed to the vehicle seat 100 known from the prior art, is adaptable to vehicle floors of different heights.

The seat part 120 of the vehicle seat 101 is in each case illustrated in the use position in FIGS. 2A to 2C. The vehicle seat 101 here is in each case adapted to vehicle floors of different heights on account of different assembling. FIG. 2A shows the vehicle seat 101 for use in a vehicle having a high vehicle floor; FIG. 2B shows the vehicle seat 101 for use in a vehicle with a vehicle floor disposed lower in comparison to FIG. 2A; and FIG. 2C shows the vehicle seat 101 for use in a vehicle with a very low vehicle floor.

A spacing A between the base 140 and the seat part 120 is in each case conceived in such a manner that the seat reference point R is always maintained at a predefined height of the vehicle floor at which the first seat rail 142 is able to be fastened, i.e. the occupant always sits at a specific height in terms of a vehicle coordinate system. More graphically, an occupant is always seated at the same height in different vehicles in which the vehicle seat is able to be installed, independently of the height at which the vehicle floor is in each case disposed.

For example, the seat reference point R in the use position can be approx. 290 mm above the vehicle floor. According to the invention, it is possible to be able to use the vehicle seat 101 also in variants of the vehicle that has a vehicle floor disposed at a greater height, without elevating the seat reference point R. In FIG. 2B, the vehicle floor is elevated to the extent that the seat reference point R in the use position is only approx. 260 mm above the vehicle floor, for example. In FIG. 2C the vehicle floor is elevated to the extent that the seat reference point R in the use position is only approx. 230 mm above the vehicle floor, for example.

It is described in detail hereunder how the vehicle seat 101 is adaptable to the vehicle floors of different heights without changing the seat reference point R.

For articulating the rocker 160 on the adapter 151, the adapter 151 has a plurality of, presently exactly two, first articulation points 191A, 191B. One of the two first articulation points 191A, 191B is selected (in particular prior to the initial assembling of the vehicle seat 101) as a function of the height of the vehicle floor of the vehicle in which the vehicle seat 101 is able to be used, and the position of the first rotary joint I relative to an external contour of the adapter 151 is determined as a result. Both first articulation points 191A, 191B are in each case suitable for articulating the first rotary joint I on the adapter 151, in particular for forming the first rotary joint I, wherein the articulation can always only take place alternatively on one of the two first articulation points 191A, 191B. The two first articulation points 191A, 191B presently are in each case configured as a circular opening in the adapter 151, in particular for pivotably mounting a rotary bearing pin of the first rotary joint I, which is preferably fixedly connected to the rocker 160. One of the two first articulation points 191A lies above the other of the two first articulation points 191B.

For articulating the rocker 160 on the lateral part 123, the lateral part 123 has a plurality of, presently exactly two, second articulation points 192A, 192B. One of the two second articulation points 192A, 192B is selected (in particular prior to the assembling of the vehicle seat 101) as a function of the height of the vehicle floor of the vehicle in which the vehicle seat 101 is able to be used, and the position of the second rotary joint II relative to an external contour of the lateral part 123 is determined as a result. Both second articulation points 192A, 192B are in each case suitable for articulating the second rotary joint II on the lateral part 123, in particular for forming the second rotary joint II, wherein the articulation can always only take place alternatively on one of the two second articulation points 192A, 192B. The two second articulation points 192A, 192B presently are in each case configured as a circular opening in the lateral part 123, in particular for pivotably mounting a rotary bearing pin of the second rotary joint II, which is preferably fixedly connected to the rocker 160. One of the two second articulation points 192A lies above the other of the two second articulation points 192B.

For articulating the further rocker 170 on the adapter 151, the adapter 151 has a plurality of, presently exactly two, third articulation points 193A, 193B. One of the two third articulation points 193A, 193B is selected (in particular prior to assembling the vehicle seat 101) as a function of the height of the vehicle floor of the vehicle in which the vehicle seat 101 is able to be used, and the position of the third rotary joint III relative to the external contour of the adapter 151 is determined as a result. Both third articulation points 193A, 193B are in each case suitable for articulating the third rotary joint III on the adapter 151, in particular for forming the third rotary joint III, wherein the articulation can always only take place alternatively on one of the two third articulation points 193A, 193B. The two third articulation points 193A, 193B presently are in each case configured as a circular opening in the adapter 151, in particular for pivotably mounting a rotary bearing pin of the third rotary joint III, which is preferably fixedly connected to the further rocker 170. One of the two third articulation points 193A lies above the other of the two third articulation points 193B.

For articulating the further rocker 170 on the lateral part 123, the lateral part 123 has a plurality of, presently exactly two, fourth articulation points 194A, 194B. One of the two fourth articulation points 194A, 194B is selected (in particular prior to the assembling of the vehicle seat 101) as a function of the height of the vehicle floor of the vehicle in which the vehicle seat 101 is able to be used, and the position of the fourth rotary joint IV relative to the external contour of the lateral part 123 is determined as a result. Both fourth articulation points 194A, 194B are in each case suitable for articulating the fourth rotary joint IV on the lateral part 123, in particular for forming the fourth rotary joint IV, wherein the articulation can always only take place alternatively at one of the two fourth articulation points 194A, 194B. The two fourth articulation points 194A, 194B presently are in each case configured as a circular opening in the lateral part 123, in particular for pivotably mounting a rotary bearing pin of the fourth rotary joint IV, which is preferably fixedly connected to the further rocker 170. One of the two fourth articulation points 194A lies above the other of the two fourth articulation points 194B.

In order to generate the spacing A illustrated in FIG. 2A, the lower first articulation point 191B, the upper second articulation point 192A, the lower third articulation point 193B, and the upper fourth articulation point 194A are selected, and the rockers 160, 170 are correspondingly articulated thereon.

In order to generate the spacing A illustrated in FIG. 2B, the lower first articulation point 191B, the lower second articulation point 192B, the lower third articulation point 193B, and the lower fourth articulation point 194B are selected, and the rockers 160, 170 are correspondingly articulated thereon.

In order to generate the spacing A illustrated in FIG. 2C, the upper first articulation point 191A, the lower second articulation point 192B, the upper third articulation point 193A, and the lower fourth articulation point 194B are selected, and the rockers 160, 170 are correspondingly articulated thereon.

It is moreover conceivable that for generating a spacing A not illustrated, the upper first articulation point 191A, the upper second articulation point 192A, the upper third articulation point 193A, and the upper fourth articulation point 194A are selected, and the rockers 160, 170 are correspondingly articulated thereon.

In order to adapt the position of the locking device 180 to the different spacings A, the position of the locking device 180 relative to the lateral part 123 is selected and used in correspondingly different ways. To this end, the attachment adapter 184 can be connected, for example screwed, riveted or welded, to the lateral part 123 in correspondingly different positions.

Figure 3A:
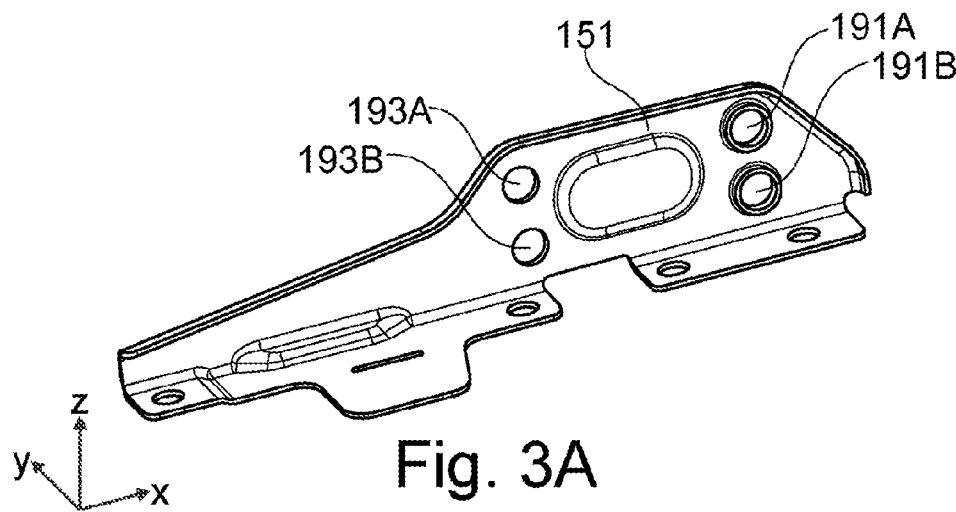
FIG. 3A: shows a perspective view of an adapter of the vehicle seat according to the invention illustrated in FIGS. 2A to 2C, said adapter having circular openings for an upper first articulation point and an upper third articulation point as well as a lower first articulation point and a lower third articulation point.

FIG. 3A shows a perspective view of the adapter 151 of the vehicle seat 101 according to the invention. The adapter has circular openings for an upper first articulation point 191A and an upper third articulation point 193A, as well as for a lower first articulation point 191B and a lower third articulation point 193B.

Figure 3B:
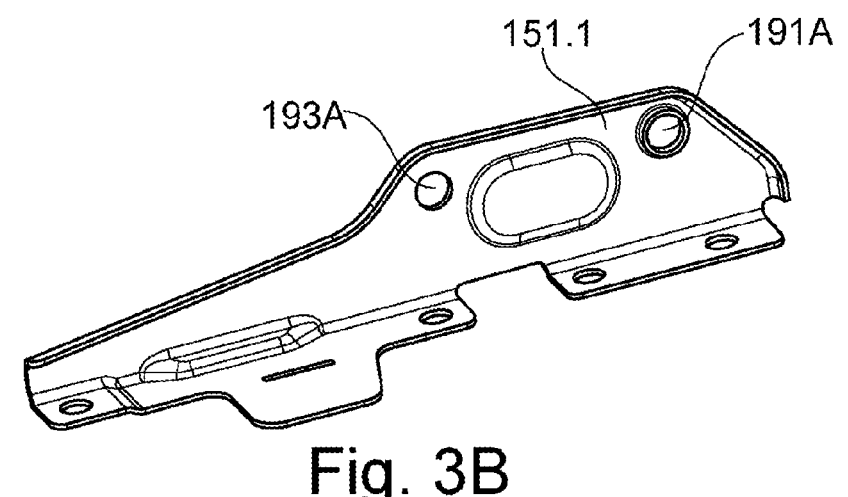
FIG. 3B: shows a perspective view of an adapter for a vehicle seat according to the variant of the exemplary embodiment, whereby circular openings for an upper first articulation point and an upper third articulation point have been incorporated in this adapter by at least one interchangeable tool insert.

Illustrated in FIGS. 3A and 3B is in each case an adapter 151.1 and an adapter 151.2 of a variant of the previously described exemplary embodiment. The variant differs from the previously described exemplary embodiment exclusively in terms of the modified adapters 151.1, 151.2. With the exception of a hole pattern, the three-dimensional shape of the adapter 151.1 corresponds to the three-dimensional shape of the adapter 151 of the previously described exemplary embodiment. With the exception of a hole pattern, the three-dimensional shape of the adapter 151.1 moreover corresponds to the three-dimensional shape of the adapter 151.2.

The adapter 151.1 (illustrated in FIG. 3B) differs from the adapter 151 (illustrated in FIG. 3A) exclusively in that the adapter 151.1 indeed has the circular openings for the upper first articulation point 191A and the upper third articulation point 193A, but not the openings for the lower first articulation point 191B and the lower third articulation point 193B.

Figure 3C:
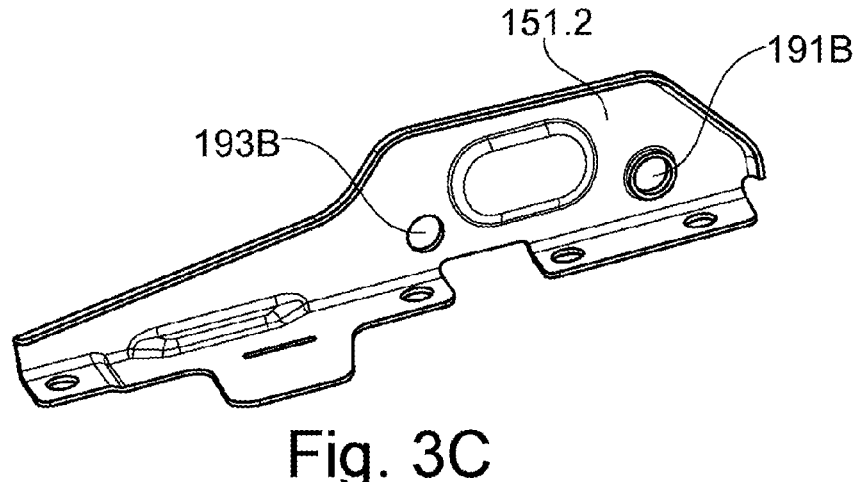
FIG. 3C: shows a perspective view of the adapter for the vehicle seat according to the variant of the exemplary embodiment, whereby circular openings for a lower first articulation point and a lower third articulation point have been incorporated in this adapter by at least one interchangeable tool insert.

The adapter 151.2 (illustrated in FIG. 3C) differs from the adapter 151 (illustrated in FIG. 3A) exclusively in that the adapter 151.2 indeed has the circular openings for the lower first articulation point 191B and the lower third articulation point 193B, but not the openings for the upper first articulation point 191A and the upper third articulation point 193A.

The adapters 151.1 and 151.2 are produced by the same forming tool, wherein the forming tool has interchangeable inserts for generating the upper first articulation point 191A, the upper third articulation point 193A, the lower first articulation point 191B, and the lower third articulation point 193B.

A method for producing a vehicle seat according to the variant of the exemplary embodiment provides that, upon selection of the articulation points, a corresponding adapter 151.1 and 151.2 is selected and supplied to the assembly line.

The features disclosed in the above description, the claims and the figures may be significant both individually and in combination for implementing the invention in its various embodiments.

LIST OF REFERENCE SIGNS

100 Vehicle seat (prior art)
101 Vehicle seat (according to the invention)
110 Backrest
120 Seat part
122 Lateral part (of the vehicle seat 100)
123 Lateral part (of the vehicle seat 101)
130 Fitting
132 Fitting adapter
140 Base
142 First seat rail
144 Second seat rail
150 Adapter (of the vehicle seat 100)
151 Adapter (of the vehicle seat 101)
160 Rocker
170 Further rocker
180 Locking device
182 Counter element
184 Attachment adapter
191A (Upper) first articulation point
191B (Lower) first articulation point
192A (Upper) second articulation point
192B (Lower) second articulation point
193A (Upper) third articulation point
193B (Lower) third articulation point
194A (Upper) fourth articulation point
194B (Lower) fourth articulation point
I First rotary joint
II Second rotary joint
III Third rotary joint
IV Fourth rotary joint
R Seat reference point
S Backrest pivot axis
x Longitudinal direction
z Vertical direction

The invention claimed is:

1. A motor vehicle seat, comprising:
a seat part which is transferable from at least one use position, suitable for conveying a passenger, to at least one non-use position and back;
a backrest articulated on the seat part;
a base which is connectable to a vehicle floor; and
a seat kinematics which pivotably connects the seat part to the base so as to transfer the seat part from the use position to the at least one non-use position and back, wherein the seat kinematics has a rocker which by a first rotary joint is pivotably articulated on an adapter that is fixedly connected to the base, and by a second rotary joint is pivotably articulated to the seat part, wherein a spacing between the base and the seat part disposed in the use position is variable by selecting a first articulation point for articulating the first rotary joint, on the adapter that is fixedly connected to the base, and by selecting a second articulation point for articulating the second rotary joint on the seat part, wherein the adapter has at least two selectable articulation points for exactly one rotary joint.

2. The vehicle seat as claimed in claim 1, wherein the seat part in the use position is adapted to be locked by a counter element that is fixedly connected to the base or the vehicle floor by a locking mechanism.

3. The vehicle seat as claimed in claim 2, wherein the locking mechanism is embodied as a rotary latch hook.

4. The vehicle seat as claimed in claim 2, wherein the locking mechanism is connected to the seat part by an attachment adapter, wherein a position of the attachment adapter relative to the seat part, is adaptable to the spacing.

5. The vehicle seat as claimed in claim 2, wherein the locking mechanism is connected to the seat part by an attachment adapter, wherein a position of the locking mechanism relative to the attachment adapter is adaptable to the spacing.

6. The vehicle seat as claimed in claim 1, wherein the seat kinematics has a further rocker which by a third rotary joint is pivotably articulated on the base or an adapter that is fixedly connected to the base, and by a fourth rotary is pivotably articulated on the seat part, wherein a third articulation point for articulating the third rotary joint on the base or on the adapter that is fixedly connected to the base, and/or a fourth articulation point for articulating the fourth rotary joint on the seat part, are/is selected so as to correspond to the spacing.

7. The vehicle seat as claimed in claim 1, wherein a lateral part of the seat part has at least two selectable articulation points for exactly one rotary joint.

8. The vehicle seat as claimed in claim 1, wherein the spacing can be implemented by selecting an adapter from a parts kit having at least two adapters.

9. The vehicle seat as claimed in claim 8, wherein the at least two adapters, with the exception of the disposal of the articulation points, are identically configured.

10. The vehicle seat as claimed in claim 1, wherein the adapter is screwed to the base.

11. The vehicle seat as claimed in claim 1, wherein at least one articulation point has an opening in a lateral part of the seat part, or in the base or an adapter that is fixedly connected to the base.

12. The vehicle seat as claimed in claim 11, wherein the opening is provided for mounting and/or passing through a rotary bearing pin.

13. A method for assembling a vehicle seat, wherein
i. spacing between a base and a seat part disposed in a use position is specified;
ii. a selection of a first articulation point for articulating a first rotary joint on an adapter that is fixedly connected to a base, and a selection of a second articulation point for articulating a second rotary joint on the seat part, take/takes place so as to correspond to the specified spacing,
wherein the adapter comprises at least two selectable articulation points for exactly one rotary joint;
iii. the first rotary join in the selected articulation point is connected to or formed with the base, and the adapter that is fixedly connected to the base, and the second rotary joint in the selected articulation point is connected to or formed with the seat part.

14. The method as claimed in claim 13, wherein a locking mechanism is positioned relative to the seat part and fastened to the seat part as a function of the specified spacing.

15. A motor vehicle seat, comprising:
a seat part which is transferable from at least one use position, suitable for conveying a passenger, to at least one non-use position and back;
a backrest articulated on the seat part;
a base which is connectable to a vehicle floor; and
a seat kinematics which pivotably connects the seat part to the base so as to transfer the seat part from the use position to the at least one non-use position and back, wherein the seat kinematics has a rocker which by a first rotary joint is pivotally articulated on an adapter that is fixedly connected to the base, and by a second rotary joint is pivotally articulated to the seat part, wherein a spacing between the base and the seat part disposed in the use position is variable by selecting a first articulation point for articulating the first rotary joint on the adapter that is fixedly connected to the base, and by selecting a second articulation point for articulating the second rotary joint on the seat part, wherein the seat part in the use position is adapted to be locked by a counter element that is fixedly connected to the base or the vehicle floor by a locking mechanism, wherein the locking mechanism is connected to the seat part by an attachment adapter, wherein a position of the locking mechanism relative to the attachment adapter is adaptable to the spacing.

16. The vehicle seat as claimed in claim 15, wherein the locking mechanism is embodied as a rotary latch hook.

17. The vehicle seat as claimed in claim 15, wherein a lateral part of the seat part has at least two selectable articulation points for exactly one rotary joint.

18. The vehicle seat as claimed in claim 15, wherein the adapter is screwed to the base.

* * * * *